United States Patent Office 3,057,542
Patented Oct. 9, 1962

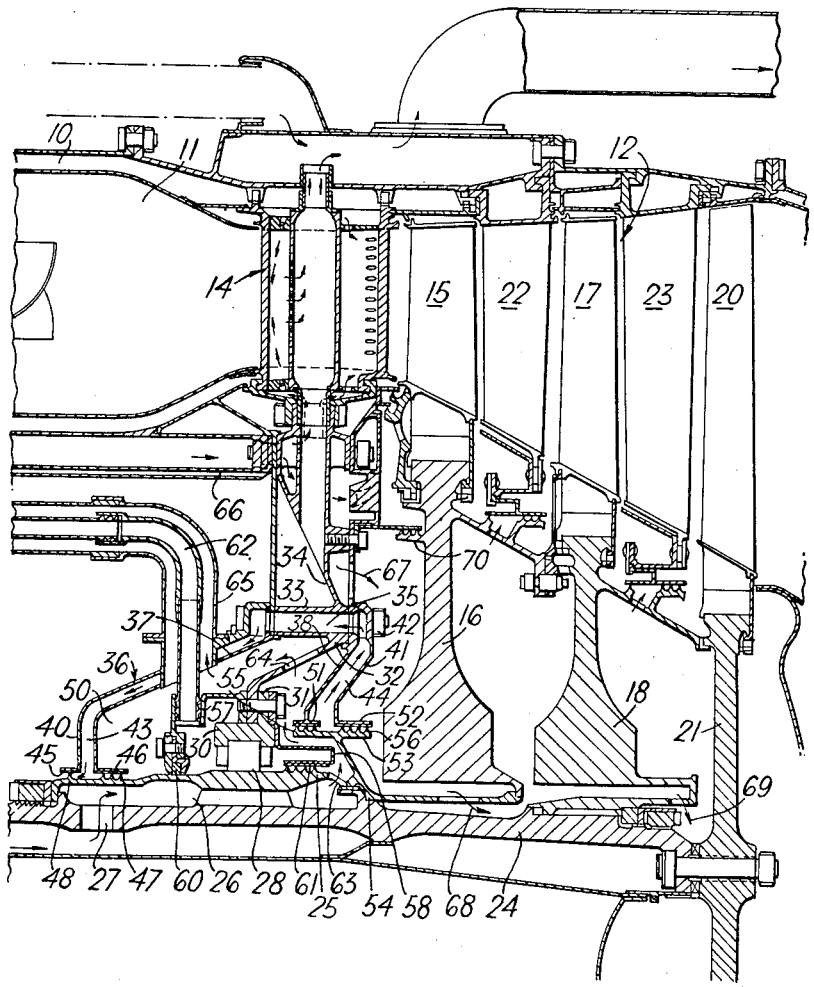

3,057,542
BEARING ASSEMBLY
John Gregory Keenan, Alvaston, Derby, England, and David Craigie, Edinburgh, Scotland, assignors to Rolls-Royce Limited, Derby, England, a company of Great Britain
Filed June 5, 1961, Ser. No. 114,975
Claims priority, application Great Britain June 7, 1960
9 Claims. (Cl. 230—116)

This invention concerns bearing assemblies and, although the invention is not so restricted, it is more particularly concerned with the cooling of a bearing within which is journalled a main shaft of a gas turbine engine.

According to the present invention there is provided a bearing assembly comprising two relatively movable members a first member of which is provided with a bearing within which the second member is movably mounted, a casing which forms a sealed enclosure within which the bearing is disposed, the casing having spaced inner and outer walls between which there is a passage for the flow of hot gas, means for supplying cooling fluid to said enclosure (or to a space within said enclosure) so as to effect cooling of said bearing, and means enabling any hot gas entering said passage to escape therefrom outwardly of said enclosure.

Preferably the casing is fast with the said first member and the inner and outer walls of the casing are provided with seals by means of which the walls are sealed to the said second member, the outer wall having a seal through which any hot gas which has entered the passage may escape outwardly of the bearing assembly.

The outer wall preferably has two seals by means of which it is sealed to the said second member, the exterior of one of said seals being open to a flow of hot gas, any hot gas passing through said one seal flowing along the passage and escaping through the other seal.

The seals are preferably labyrinth seals. Thus the said seal through which the hot gas may escape is preferably constituted by a labyrinth seal having a single circumferential rib.

The said second member may comprise a shaft which is rotatably mounted in a sleeve, the sleeve constituting the said first member. Thus the shaft may be hollow, the hollow interior of the shaft communicating with said enclosure and with a source of cooling fluid.

The invention also comprises a gas turbine engine provided with a bearing assembly as set forth above.

In the preferred form of the present invention there is provided a gas turbine engine comprising an engine casing, turbine means and compressor means mounted on a common shaft mounted axially within the engine casing, means fast with the engine casing and provided with a bearing within which the shaft is journalled, a bearing casing which is fast with the engine casing and which forms a sealed enclosure within which the bearing is disposed, the bearing casing having spaced inner and outer walls each of which is provided with two seals by means of which the inner and outer walls are sealed to said shaft or to structure carried by said shaft, one of the said two seals of the outer wall being disposed adjacent said turbine means and the other seal being disposed remote therefrom, means for supplying cooling fluid to said enclosure (or to a space within said enclosure) so as to cool the bearing, and means for providing a flow of cooling fluid onto heated surfaces of the turbine means, the construction being such that cooling fluid which has become heated by passing over said heated surfaces and which has passed through the said one seal so as to enter the space between said inner and outer walls may flow through said space and may escape through the said other seal.

The invention is illustrated, merely by way of example, in the accompanying drawing which is a section through part of a gas turbine engine provided with a bearing assembly in accordance with the present invention.

Referring to the drawing, a gas turbine, jet propulsion engine for an aircraft comprises an engine casing 10 within which is mounted in flow series a compressor (not shown), combustion equipment 11 and a three-stage turbine 12, the exhaust gases from the turbine 12 being discharged to atmosphere through a jet pipe 13.

The turbine 12 comprises nozzle guide vanes 14, first stage blades 15 carried by a rotor disc 16, second stage blades 17 carried by a rotor disc 18, and third stage blades 20 carried by a rotor disc 21, rows of stator blades 22, 23 being disposed between the blades 15, 17 and 17, 20 respectively.

The rotor discs 16, 18, 21 are secured to a common hollow shaft 24 on which is mounted the compressor (not shown) of the engine. The shaft 24 is mounted within and splined onto a sleeve 25 between which and the shaft 24 there is an annular space 26. The space 26 communicates with the hollow interior of the shaft 24 by way of apertures 27 in the shaft 24.

The sleeve 25 is journalled within a bearing 28 carried by a sleeve 30. The sleeve 30 has a radially outwardly extending annular flange 31 which is bolted to an annular web 32, the web 32 forming part of an annular member 33 which is carried from the engine casing 10 by substantially radially extending struts 34. The annular member 33 has an annular bore 35 which extends axially of the engine.

The annular member 33 forms part of a double-walled casing 36. The casing 36 has inner walls 37, 38 and outer walls 40, 41, the walls 37, 38, 40, 41 being secured by bolts 42 to the annular member 33. The walls 37, 40 and 38, 41 are spaced apart to provide therebetween passages 43, 44 respectively, the passages 43, 44 communicating with opposite axially spaced ends of the annular member 33.

The walls 37, 40 are sealed to the sleeve 25 by labyrinth seals 45, 46 respectively. The seal 46 comprises three annular sealing ribs 47 on the sleeve 25 whereas the seal 45 comprises only one such rib 48. This construction of the seals 45, 46 together with the gas pressures acting on opposite sides of them, ensures that any hot gas within the passage 43 may pass fairly readily through the seal 45 and outwardly of the casing 36, whereas the flow of gas from the passage 43 and through the seal 46 into the space 50 within the casing 36 is substantially completely prevented.

The walls 41, 38 are sealed by labyrinth seals 51, 52 respectively to a flange 53 of a sleeve 54, the sleeve 54 being splined onto the shaft 24. It will be noted that the seals 51, 52 respectively comprise three annular sealing ribs 55 and four annular sealing ribs 56 on the flange 53 and this construction substantially prevents any gas from flowing therethrough.

Bolted to the flange 31 are casing members 57, 58 which together constitute a lubricant chamber within which the bearing 28 is located, the casing members 57, 58 being sealed to the sleeve 25 by seals 60, 61 respectively. A pipe 62, which is supplied with lubricating oil (by means not shown) communicates with the interior of the said lubricant chamber.

The interior of the shaft 24 is supplied with cooling air from the compressor (not shown) and this cooling air passes via the apertures 27 into the space 26 and via apertures 63 in the sleeve 25 to the space 50. This cooling air thus cools the walls of the lubricant chamber within which the bearing 28 is located and finally passes to atmosphere via apertures 64 in the web 32 and through an outlet duct 65 which is arranged concentrically around the pipe 62.

The turbine discs 16, 18, 21 are cooled by a flow of cooling air from the compressor. The said flow of cooling air is supplied through a conduit 66, the path along which the cooling air flows being indicated by the arrows 67, 68, 69. A labyrinth seal 70, which is carried by the rotor disc 16, is provided to prevent the hot gases which are supplied to the turbine 12 from passing down the rear face of the rotor disc 16.

It will be appreciated that the cooling air passing down the outside of the wall 41 will have become heated by its passage over heated surfaces of the turbine 12, and more particularly will this be the case if there is any leak through the seal 70. This heated air, however, is prevented from causing overheating of the bearing 28 both because the bearing 28 is cooled by the cooling air supplied through the shaft 24 and because of the double-walled construction of the casing 36. Thus if there should be any leakage of this heated air through the seal 52 and into the passage 44, the heated air will merely flow through the bore 35 and passage 43 and so pass outwardly of the casing 36 via the seal 45.

We claim:

1. A bearing assembly comprising two relatively movable members, a bearing carried by the first of said members, the second member being movably mounted within said bearing, a first casing which forms a sealed lubricant chamber within which the bearing is disposed, a second casing which forms a sealed enclosure surrounding the first casing, said second casing having spaced inner and outer walls between which there is a passage which is substantially sealed against the ingress of hot gas, means for supplying cooling fluid to said enclosure so as to effect cooling of said first casing and the bearing disposed therein, and means enabling any hot gas entering said passage to escape therefrom outwardly of said enclosure.

2. A bearing assembly comprising two relatively movable members, a bearing carried by the first of said members, the second member being movably mounted within said bearing, first and second casings which are fast with the first member, said first casing forming a sealed lubricant chamber within which the bearing is disposed, said second casing forming a sealed enclosure surrounding the first casing, said second casing having spaced inner and outer walls between which there is a passage for the flow of hot gas, means for supplying cooling fluid to said enclosure so as to effect cooling of said first casing and the bearing disposed therein, and seals by means of which the inner and outer walls are sealed to the said second member, the seal of the outer wall enabling any hot gas which has entered the passage to escape therethrough and outwardly of the bearing assembly.

3. A bearing assembly comprising two relatively movable members, a bearing carried by the first of said members, the second member being movably mounted within said bearing, first and second casings which are fast with the first member, said first casing forming a sealed lubricant chamber within which the bearing is disposed, said second casing forming a sealed enclosure surrounding the first casing, said second casing having spaced inner and outer walls between which there is a passage for the flow of hot gas, means for supplying cooling fluid to said enclosure so as to effect cooling of said bearing, and two seals by means of which the outer wall is sealed to the said second member, the exterior of one of said seals being open to a flow of hot gas, any hot gas passing through said one seal flowing along the passage and escaping through the other seal.

4. A bearing assembly as claimed in claim 3 in which the seals are labyrinth seals.

5. A bearing assembly comprising two relatively movable members, a bearing carried by the first of said members, the second member being movably mounted within said bearing, first and second casings which are fast with the first member, said first casing forming a sealed lubricant chamber within which the bearing is disposed, said second casing forming a sealed enclosure surrounding the first casing, said second casing having spaced inner and outer walls between which there is a passage for the flow of hot gas, means for supplying cooling fluid to said enclosure so as to effect cooling of said first casing and the bearing disposed therein, and two seals by means of which the outer wall is sealed to the said second member, the exterior of one of said seals being open to a flow of hot gas, any hot gas passing through said one seal flowing along the passage and escaping through the other seal, the said other seal being a labyrinth seal having a single circumferential rib.

6. A bearing assembly comprising a sleeve, a shaft rotatably mounted in the sleeve, a bearing carried by the sleeve and within which the shaft is journalled, a first casing which forms a sealed lubricant chamber within which the bearing is disposed, a second casing which forms a sealed enclosure surrounding the first casing, said second casing having spaced inner and outer walls between which there is a passage which is substantially sealed against the ingress of hot gas, means for supplying cooling fluid to said first casing and the enclosure so as to effect cooling of said bearing disposed therein, and means enabling any hot gas entering said passage to escape therefrom outwardly of said enclosure.

7. A bearing assembly comprising a sleeve, a hollow shaft rotatably mounted in the sleeve, a bearing carried by the sleeve and within which the shaft is journalled, a first casing which forms a sealed lubricant chamber within which the bearing is disposed, a second casing which forms a sealed enclosure surrounding the first casing, said second casing having spaced inner and outer walls between which there is a passage which is substantially sealed agains the ingress of hot gas, a source of cooling fluid, the hollow interior of the shaft communicating with said enclosure and with said source of cooling fluid whereby cooling fluid is supplied to said enclosure and cools said first casing and the bearing disposed therein, and means enabling any hot gas entering said passage to escape therefrom outwardly of said enclosure.

8. A bearing assembly as claimed in claim 6 in which there is an outlet duct for the removal of cooling fluid from the enclosure, the outlet duct being concentric with a pipe for supplying the bearing with a lubricant.

9. A gas turbine engine comprising an engine casing, a shaft mounted axially within the engine casing, turbine means and compressor means mounted on said shaft, means fast with the engine casing and provided with a bearing within which the shaft is journalled, first and second casings which are fast with the engine, said first casing forming a sealed lubricant chamber within which the bearing is disposed, and said second casing forming a sealed enclosure surrounding the first casing, said second casing having spaced inner and outer walls each of which is provided with two seals by means of which the inner and outer walls are sealed to said shaft one of the said two seals of the outer wall being disposed adjacent said turbine means and the other seal being disposed remote therefrom, means for supplying cooling fluid to said enclosure so as to cool the bearing disposed therein, and means for providing a flow of cooling fluid onto heated surfaces of the turbine means, cooling fluid which has become heated by passing over said heated surfaces and which has passed through the said one seal so as to enter the space between said inner and outer walls being permitted to flow through said space and to escape through the said other seal.

References Cited in the file of this patent

UNITED STATES PATENTS 2,584,973    Andermatt _____ Feb. 12, 1952